United States Patent Office 3,328,115
Patented June 27, 1967

3,328,115
PROCESS FOR CATALYTICALLY PURIFYING
GASES CONTAINING OXIDES OF NITROGEN
Carl D. Keith, Summit, and Paula M. Kenah, East
Orange, N.J., assignors to Engelhard Industries, Inc.,
Newark, N.J., a corporation of Delaware
No Drawing. Original application Aug. 17, 1962, Ser. No.
217,531, now Patent No. 3,245,920, dated Apr. 12,
1966. Divided and this application Sept. 23, 1965, Ser.
No. 489,740
8 Claims. (Cl. 23—2)

This application is a division of copending application Ser. No. 217,531, filed Aug. 17, 1962, now Patent No. 3,245,920.

This invention relates to the catalytic purification of gases containing nocuous constituents and more especially to a process for the removal of oxides of nitrogen from gases containing these constituents, for instance the waste or tail gases produced by the oxidation of ammonia in the production of nitric acid, and a catalyst for such purification.

Tail gases from plants for the production of nitric acid by the oxidation of ammonia usually contain nocuous oxides of nitrogen, viz. NO and $NO_2$. The less harmful $N_2O$ may also be present. The presence of these oxides of nitrogen in the tail gases is due to the incomplete conversion of the nitrogen oxides to nitric acid and, as a result, the nocuous oxides of nitrogen have been discharged to the atmosphere heretofore with the tail gases. The discharge of these oxides of nitrogen to the atmosphere is undesirable for the reason they are of a corrosive nature and prevent risk of injury to vegetable and animal life.

The waste gases from nitration and nitric acid processes typically contain, by volume, from a trace to about 2 percent of NO, trace to about 2 percent of $NO_2$, trace to about 10 percent of $N_2O$, about 1–22 percent of $O_2$, and the balance inert constituents such as nitrogen and argon. The gas may also contain water vapor in amounts up to about 8 percent by volume.

The harmful nitrogen oxides, NO and $NO_2$, have been removed from the tail gases of nitric acid plants heretofore by admixing ammonia with the tail gases and contacting the admixture with a platinum group metal catalyst, usually platinum on activated alumina. If $N_2O$ is present, it has little or no reaction with the ammonia. Catalysts previously used for this purpose contained the platinum group metal supported on the activated alumina in the form of small crystallites of size considerably below 50 Angstrom units and free or substantially free of crystallites larger than 50 Angstrom units as determined by X-ray diffraction measurement. Ammonia has been utilized as fuel because it effects selective removal of the nitrogen oxides without removing the $O_2$ present. The catalyst has given satisfactory results in plant scale operation for about 1–2 months time after which it became inactive and hence was unsatisfactory in the process. The catalyst underwent a change in its appearance during its inactivation which is referred to herein as bleaching of the catalyst. The bleaching of the catalyst was found to take place only when ammonia, nitrogen dioxide and oxygen pass over the platinum on activated alumina catalyst with the platinum metal being in the form of small crystallites materially below 50 A. in size. This bleaching deactivation is believed to be due to an oxidation of platinum followed by migration of the oxidized platinum from the surface of the alumina into the $Al_2O_3$ lattice so that it is dispersed throughout the interior of the alumina.

Crystallite sizes have been determined for small amounts of various solid materials in the presence of larger amounts of other solid materials by well known methods, for example as described in "X-Ray Diffraction Procedures," authorized by H. P. Klug and L. E. Alexander, published by John Wiley & Sons, Inc., London and New York, 1954 edition. The X-ray diffraction technique is particularly described in Chapter IX of this book which distinguishes methods for determination of relative crystallite sizes and absolute crystallite sizes. As relative crystallite size determination requires a correction corresponding to the instrument used, X-ray crystallite data and ranges as reported hereafter in this patent application have been determined on the absolute basis.

In accordance with the present invention, it has now been found that by contacting the admixture of nitric acid plant tail gas and ammonia with the platinum group metal-containing catalyst with the catalytic metal, preferably platinum, essentially constituted of crystallites of absolute crystallite size of about 60 Angstrom units or larger, preferably from about 500 to about 900 Angstrom units, and free or substantially free of crystallites much smaller than 60 Angstrom units as determined by X-ray diffraction measurement, the process was satisfactorily carried out with the removal of the nocuous nitrogen oxides, i.e. NO and $NO_2$ for about 3–4 times longer than when the prior art catalyst previously mentioned herein constituted of relatively small crystallites considerably smaller than 50 Angstrom units and free or substantially free of crystallites larger than 50 Angstrom units was utilized. This was due to the catalyst of this invention of relatively large crystallite size having a considerably longer active life, being about four times longer than the life of the prior art relatively small crystallite platinum metal catalyst previously referred to. The economic advantage of being able to carry out the process for the considearbly longer period is readily apparent.

The large crystallite platinum group metal is preferably supported on a carrier and the preferred carrier is a partially sintered, low area alumina having a surface area before use within the range of about 10–100 square meters per gram, preferably about 30–80 square meters per gram, as this results in a catalyst having a still greater life and activity. The surface area is determined by the BET method. This alumina is obtained by sintering an activated alumina at a temperature of from about 700° C.–1000° C., preferably from about 800° C.–900° C. The sintering results in a collapse of pore walls of a material or considerable quantity of the normally accessible pores of the alumina in the activated state, to give an alumina of surface area within the ranges previously mentioned. This collapsing of a material quantity of the pore walls of the pores in the alumina together with the increased crystallite size of the platinum group metal as previously disclosed herein are believed jointly responsible for the improved decreased tendency for bleaching of the alumina support, and also for the decreased tendency for the platinum group metal on the surface skin of the alumina support to migrate into the interior of the support with attendant loss of activity of the catalyst. The activated alumina which is sintered may contain minor amounts of silica, zirconia, or titania, for instance, by weight from about 0.1–30 percent of silica, zirconia or titania.

In the sintering of the alumina, two decomposition sequences for gibbsite (alpha trihydrate) take place when the heating is carried out in dry air according to the technical paper, "Alumina Properties," by A. S. Russell et al., Aluminum Company of America (1956). One is a direct dehydration of a major portion of the gibbsite to chi alumina and the other a decomposition of a minor portion of the gibbsite by way of boehmite (the alpha monohydrate) to gamma alumina. The chi alumina converts to kappa alumina beginning at 500° C., and a major portion of the gamma alumina converts to theta alumina beginning at 850° C. Thus, the partially sintered alumina of this invention contains a major amount of kappa alumina and, when sintered at 850° C. or above, minor amounts of theta and gamma aluminas.

The carrier for the relatively large crystallite platinum group metal of this invention can also be silica, silica gel, diatomaceous earth, mullite, etc. for catalysts for the tail or waste gas purification process, although the partially sintered alumina is the preferred carrier as previously specified. The carrier can be in the form of pellets, granules, extruded shapes or powder.

The considerably improved catalyst life and aging stability provided by the relatively large crystallite size platinum group metal of this invention with or without the sintered alumina of relatively small surface area within the range previously specified herein was unexpected and surprising, inasmuch as supported catalysts for hydrogenation processes and reforming processes require a high surface area and relatively small crystallite metal of size considerably below 50 Angstrom units for greatest life and activity.

Exemplary of other platinum group metals that can be utilized in place of the preferred platinum are palladium, rhodium, ruthenium and iridium or mixtures thereof. These platinum group metals are also in the form of crystallites of absolute crystallite sizes of about 60 Angstrom units or larger, preferabl yabout 500–900 Angstrom units, as determined by X-ray diffraction measurement. The catalytic metal is preferably present within the range of about 0.1 percent—3.0 percent by weight of the catalyst metal and support, more preferably from about 0.3–1.5 weight percent.

The relatively large crystallite size catalytic metal of this invention can be prepared by treating the alumina carrier or support with an aqueous solution of a water-soluble compound of the platinum group metal, and then reducing the compound to metal. The resulting product is then sintered at a temperature within the range of 700° C.–1000° C., to obtain the crystallites of the platinum group metal of the large absolute crystallite sizes as aforesaid. Simultaneous with obtaining this large crystallite size metal, the alumina is rendered more inert by a decrease in its surface area due to sintering and the resulting partially sintered alumina has a surface area within the range of about 10–100 square meters per gram.

The ammonia is added to the tail gas to be purified in amount within the range of the stoichiometric quantity required for complete reaction with the NO and $NO_2$ to ten times or more the quantity required, preferably one to two times the quantity required.

The mixture of the tail gas and the ammonia fuel is passed over the catalyst at a space velocity in the range of about 3,000–100,000 preferably about 3,000–30,000 standard volumes of the gas mixture per volume of catalyst per hour.

The reaction temperature may be in the range of about 150° C.–400° C., preferably about 160° C.– 300° C. The pressure may be in the range of from atmospheric to about 200 p.s.i.g. or higher.

The invention will be further illustrated by reference to the following examples:

EXAMPLE I

To a gas mixture containing by volume, approximately 0.2 percent $NO+NO_2$, 3–14 percent $O_2$, 5–6 percent $N_2O$, 2–3 percent $CO+CO_2$, and the balance inert constituents including $N_2$ was added ammonia in amount of about 0.3 percent by volume (based on the gas mixture volume). The resulting gas mixture was passed into contact with 0.5 percent platinum on conventional ⅛″ cylindrical activated alumina pellets at a temperature of the catalyst of about 220° to 300° C. The platinum was in the form of crystallities of size considerably less than 50 A. as determined by X-ray diffraction measurement and substantially free of crystallites of platinum larger than about 50 A. The space velocity of the gas mixture was about 22,000 V.H.S.V. Over 90 percent of the nocuous $NO+NO_2$ was removed from the gas. However, the useful life of the catalyst was only about 1½ months after which its activity was so low it was unsatisfactory for further use in the process.

EXAMPLE II

Four additional lots of the catalyst of Example I were separately evaluated for removal of the nocuous nitrogen oxides under the reaction conditions set forth above in Example I, and with the nitrogen oxide-containing gas mixture to be purified of similar composition and the ammonia as fuel in similar quantity as respectively the composition of gas mixture to be purified and the quantity of ammonia in Example I. While this catalyst resulted in satisfactory removal of the nitrogen oxides from the gas mixture, the catalysts were each deactivated after only 1 to 2 months of operation.

EXAMPLE III

The procedure of Example I was repeated except that the catalyst of Example I was sintered or calcined three hours in air at a temperature of 900° C. prior to its use in the process. The resulting catalyst was a platinum on alumina catalyst with the platinum in the form of crystallites of average size of about 700 A. as measured by X-ray diffraction, and substantially free of platinum crystallites smaller than 50 A. The partially sintered alumina had a surface area of 52 $M^2$/gram. Over 90 percent of the $NO+NO_2$ was removed from the gas. The catalyst gave satisfactory performance for the removal of the nitrogen oxides for about 6½ months.

It is readily seen from Example III that the catalyst of this invention having the larger size crystallites of catalytic metal is a considerable improvement in the process from the standpoint of having a considerably longer life over the conventional catalyst having the relatively small crystallite size catalytic metal. This longer useful life of the Example III catalyst, which was about four times longer than the useful life of the conventional catalysts of Examples I and II, renders the Example III catalyst more desirable from a commercial and economic standpoint for use in the process.

The catalyst of this invention, in addition to being well suited for the removal of nitrogen oxides from waste or tail gases from nitric acid plants and various nitration processes, are generally useful for high space velocity gaseous processes and particularly in reactions such as oxidation reactions where minor proportions of impurities in gas streams are to be converted or removed. The catalyst may be used with either a selective or non-selective process. The crystallites of catalytic metal are preferably supported on the superficial surface of the carrier, with the interior or inner surfaces of the carrier being free or substantially free of the catalytic metal.

It will be obvious to those skilled in the art that many modifications have been made within the scope of the present invention without departing from the spirit thereof, and this invention includes all such modifications.

What is claimed is:

1. A process for the selective removal of oxides of nitrogen from nitric acid plant tail gases, which comprises contacting an admixture of the tail gases and ammonia at reaction temperature with a platinum group metal-containing catalyst with the platinum group metal in the form of crystallites having size within the range of about 500–900 Angstrom units as determined by X-ray diffraction measurements.

2. The process of claim 1 wherein the platinum group metal is platinum.

3. The process of claim 1 wherein the platinum group metal is supported on a partially sintered, low area alumina having a material quantity of its normally accessible pores in the activated state collapsed due to the sintering.

4. The process of claim 1 wherein the platinum group metal is supported on a partially sintered low area alumina having an area within the range of about 10–100 square meters per gram.

5. The process of claim 4 further characterized in that a major portion of the partially sintered low area alumina is in the kappa phase.

6. The process of claim 4 wherein the platinum group metal is platinum.

7. The process of claim 1 wherein the contacting is effected at a temperature in the range of about 150° C.–400° C.

8. The process of claim 1 wherein the gas admixture is contacted with the catalyst at a space velocity in the range of about 3000–100,000 volumes of the gas admixture per volume of the catalyst per hour.

References Cited
UNITED STATES PATENTS 2,975,025  3/1961  Cohn et al. _____ 23—2
3,094,493  6/1963  Nixon _____ 252—466

OSCAR R. VERTIZ, Primary Examiner.

EARL C. THOMAS, Examiner.